April 11, 1939.   C. PAULSON   2,153,990
ELECTRICAL TESTING APPARATUS
Filed Oct. 15, 1937
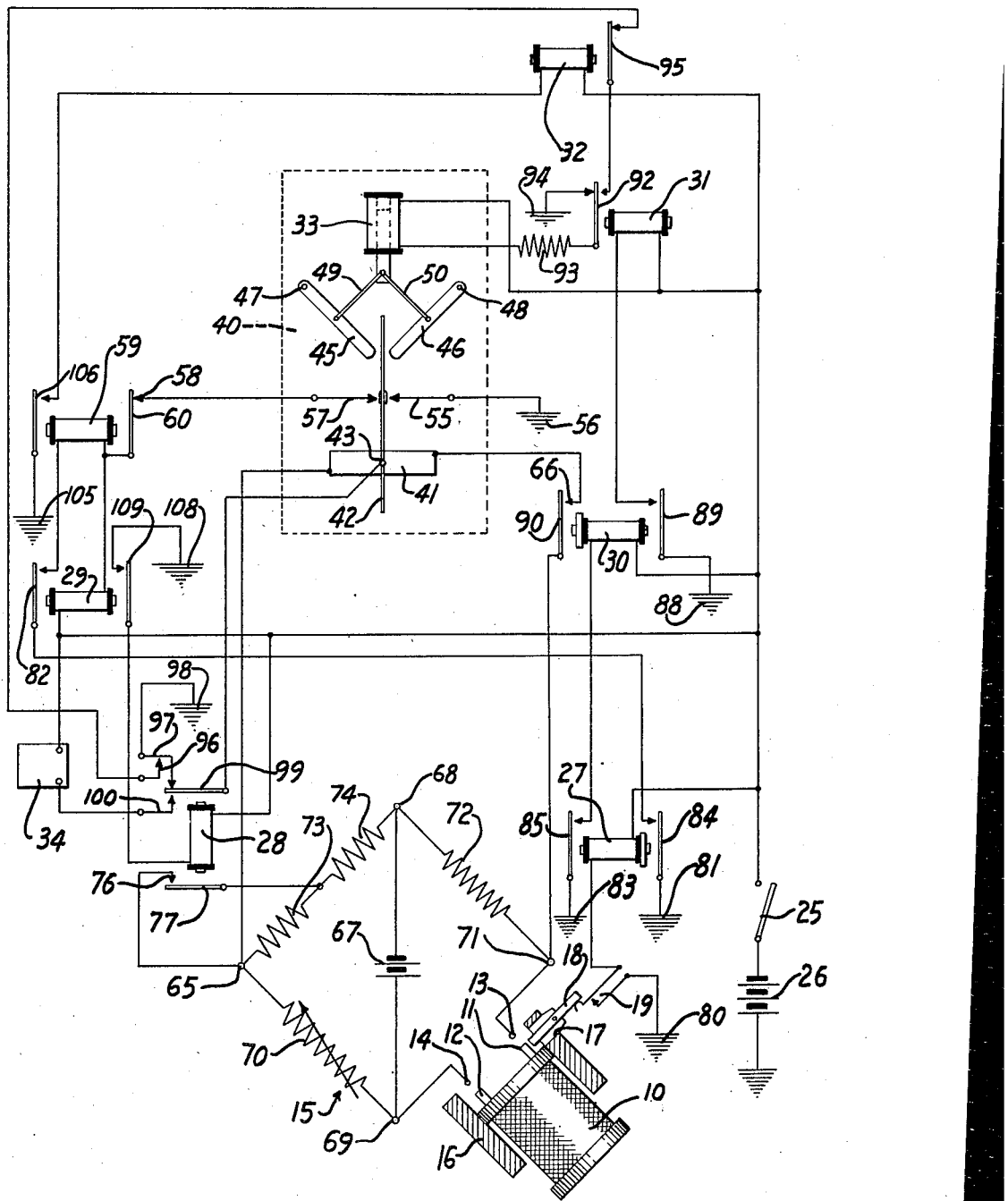
INVENTOR
C. PAULSON
BY Emery Robinson
ATTORNEY Patented Apr. 11, 1939

2,153,990

UNITED STATES PATENT OFFICE 2,153,990

ELECTRICAL TESTING APPARATUS

Christian Paulson, Elmhurst, Ill., assignor to Western Electric Company, Incorporated, New York, N. Y., a corporation of New York Application October 15, 1937, Serial No. 169,177

4 Claims. (Cl. 175—183)

This invention relates to electrical testing apparatus and more particularly to a device for determining whether a piece of electrical apparatus has certain electrical characteristics.

It is an object of the present invention to provide an apparatus for rapidly making a test for determining whether or not an article has predetermined electrical characteristics.

In accordance with one embodiment of the invention, an apparatus is provided for determining whether an electrical coil has a resistance within predetermined desirable limits. In the preferred embodiment of the invention, a coil is moved to a position where its terminals complete a Wheatstone bridge circuit, and in so moving, the coil mechanically actuates a pair of contacts to initiate the operation of a series of relays and connect a meter type relay across the bridge circuit whereby a high and low limit test are made automatically and an audible signal given if the coil under test is within the predetermined limits solely by the insertion of the coil into the apparatus.

A better understanding of the invention may be had by reference to the following detailed description of the preferred embodiment of the invention when considered in conjunction with the accompanying drawing, wherein a single schematic view shows diagrammatically the features thereof.

In the drawing, the reference numeral 10 designates a coil which is to be tested and which may be moved into a position to engage its terminals 11 and 12 with a pair of contacts 13 and 14 of a bridge circuit, indicated generally by the numeral 15. The coil 10, in being moved to position to engage its terminals 11 and 12 with the contacts 13 and 14, will pass through a suitable jig 16 having a slot 17 therein in which is pivoted a lever 18 for closing a pair of contacts 19 upon the insertion of the coil 10 into the fixture 16 and into engagement with the contacts 13 and 14. The contacts 13 and 14 are so positioned with respect to the lever 18 that contacts 13 and 14 are in engagement with terminals 11 and 12 before lever 18 closes contact 19.

A main switch 25 is provided for placing the apparatus in condition for operation. This switch 25 is adapted, upon closure thereof, to connect grounded battery at 26 to one side of the windings of each of a series of relays 27, 28, 29, 30, 31 and 32, to one side of the winding of a solenoid 33, and to one side of the winding of a buzzer 34.

The solenoid 33 forms part of a meter type relay 40, the parts of which are shown enclosed in dotted lines. This relay includes a galvanometer type movable coil 41 having fixed thereto a contactor 42 which will be rocked about a coil pivot 43 in either of two directions, depending upon the direction of unbalance of the bridge circuit 15. The contactor 42 is normally held in its midposition by a pair of levers 45 and 46, pivoted at 47 and 48, and connected to the movable element of the solenoid 33 by a pair of links 49 and 50, respectively. The contactor 42 is adapted, upon movement thereof by the movable coil 41, in a clockwise direction to engage a fixed contact 55 connected to ground at 56, and upon movement thereof in a counter-clockwise direction by the moving coil 41 to engage a fixed contact 57 connected to a fixed contact 58 of a relay 59. One side of the winding of the relay 59 is connected to its back contact 60 and to grounded battery through the winding of the relay 29. The moving coil 41 has one end of its winding connected to a point 65 on the bridge 15 and its other end is connected to a fixed contact 66 of relay 30.

The bridge circuit 15 has a battery 67 connected thereacross between the points 68 and 69, and in the arm thereof, between the points 65 and 69, has a variable resistance 70, the value of which may be adjusted to the value desired in the coil 10 to be tested. The coil 10, upon its insertion in the fixture 16, will be connected across an arm of the bridge 15 between the point 69 and a point 71. The other arms of the bridge circuit, that is, the arms between the points 68 and 71 and between the points 65 and 68, have a resistance 72 and a pair of resistances 73 and 74, respectively, connected thereacross. The resistance 72 may be of any suitable value comparable with the value of the resistances 73 and 74 combined. For example, the resistance 72 may be 500 ohms and the resistances 73 and 74 may have a value of 50 and 475 ohms resistance, respectively, and the resistance 73 is so connected that upon energization of the relay 28, it will be cut out of the bridge circuit 15. This is accomplished by connecting the point 65 of the bridge circuit to a fixed contact 76 of the relay 28 and connecting a movable contact 77 associated with the contact 76 to a point on the bridge circuit between resistances 73 and 74.

The insertion of a coil 10 into the fixture 16, as pointed out hereinbefore, will effect the closure of the pair of contacts 19. This will initiate the operation of the circuit by connecting ground at 80 to one side of the relay 27, the other side of the winding of which had been connected to grounded battery at 26 through the closure of the switch 25. The relay 27 is a retarded relay and will pull up somewhat slowly to prepare a circuit for operating relay 59 by connecting ground at 81 through make contact 84 of relay 27 to a front contact 82 of relay 29 and will complete a circuit to operate the relay 30 by connecting ground at 83 through make contact 85 to one side of the winding of the relay 30. The relay 30, upon operation, connects ground at 88 through its make contact 89 to the winding of relay 31, and relay 30, which is also a retarded relay, will connect the moving coil 41 to the bridge circuit through its fixed contact 66 and a movable contact 90 associated therewith. The energization of relay 31 over the circuit just traced will cause it to attract its break make contact 92 to break the circuit from grounded battery at 26 through the switch 25, solenoid 33 and a resistance 93 to ground at 94. The solenoid 33, it will be noted, was energized as soon as the switch 25 was closed over a circuit from grounded battery at 26 through the winding of the solenoid and through the resistance 93 to ground at 94. The energization of relay 31 will prepare a circuit to operate the solenoid 33 at a later time in the cycle of operation over a path which extends through a break contact 95 of relay 32, a make contact 96, and make before break contact 97 of relay 28 to ground at 98. The ground at 98 is normally connected through a break make contact 99 of relay 28 to the contactor 42, and upon energization of relay 28, the contact 99 is shifted into engagement with a contact 100 connected to one side of the winding of buzzer 34.

The relay 32 is energized by the operation of the relay 59, which will connect ground at 105 through its make contact 106 to the winding of the relay 32. The relay 59 will be operated serially with the relay 29 upon the energization of the relay 29 over the circuit from ground at 81 through contacts 84 and 82 of relays 27 and 29, respectively, through the winding of relay 59 and winding of relay 29 to grounded battery at 26. The energization of relay 29 controls the operation of relay 59 and relay 28 will operate when relay 29 operates due to the completion of the circuit from ground at 108 through contact 109 of relay 29, winding of relay 28 to grounded battery at 26.

It is believed that a complete understanding of the purposes and operation of the hereinbefore described apparatus and circuit connections may be had from the following description of the operation thereof. The test set is placed in condition for operation upon the closure of the switch 25, which, as pointed out hereinbefore, will supply grounded battery to the various relays and to the solenoid 33, and the solenoid will immediately be operated over the circuit from grounded battery at 26 through switch 25, winding of the solenoid, resistance 93, contact 92 to ground at 94, thereby moving the arms 45 and 46 upwardly to center the contactor 42 and hold it in its midposition. With the apparatus in this condition, the insertion of the coil 10 to be tested into the fixture 16 will connect the winding of the coil across the arm 69—71 of the bridge and the spool head of the coil will engage the lever 18 to close contacts 19 after contact has been made between terminals 11 and 12 and contacts 13 and 14. The closure of contacts 19 will connect ground at 80 to one side of the winding of the coil 27, the other side of the winding of which is connected to grounded battery at 26, thereby energizing the coil 27. Energization of the coil 27 will connect ground at 83 through contact 85 and winding of the relay 30 to grounded battery at 26, energizing relay 30. When relay 30 pulls up, it will complete the circuit through the movable coil 41 by connecting the point 71 of the bridge 15 through the contacts 90 and 66 to one side of the winding of the coil 41, the other side of the winding of which is connected to the point 65 of the bridge. Simultaneously, the relay 30 will connect ground at 88 through contact 89 and the winding of the coil 31 to grounded battery at 26 to energize coil 31 and release the solenoid 33, thereby to permit the movable coil 41 to move contactor 42 to either the right or left, depending upon the direction of current flow through moving coil 41.

If the resistance in the coil 10 is equal to or less than the permissible maximum limit, the current in the moving coil 41 will cause the contactor 22 to move into engagement with the contact 57, thereby to complete a circuit from ground at 98 through make before break contact 97, break make contact 99, contactor 42, contacts 57, 58 and 60, to one end of the winding of the coil of relay 29, the other end of which is connected to grounded battery at 26. Thus, if the resistance of a coil under test is equal to or less than the maximum resistance, the relay 29 will be energized, and upon energization will connect ground at 108 through contact 109 to the winding of the relay 28 to energize it and will connect ground at 81 through contact 84 of energized relay 27 and contact 82 of relay 29 to the winding of relay 59. Relay 59 will thus have ground upon both ends of its winding until solenoid 33 is operated again, at which time relay 59 will operate to complete a circuit from ground at 105 through contact 106 to operate relay 32.

In operating, over the just described circuit, relay 28 will attract contact 99 and the circuit from ground at 98 will make on contact 96 before it breaks from contact 99 to complete a circuit from ground at 98 through contacts 97 and 96 of relay 28, contact 95 of relay 32, resistance 93, winding of solenoid 33 to grounded battery at 26, thereby operating the solenoid 33. Operation of solenoid 33 causes arms 45 and 46 to restore the contactor 42 to its midposition and hold it there until the solenoid is released. Upon completely operating, the relay 28 short circuits the section of the bridge arm 65—68, which includes the resistance 73, thereby preparing the apparatus to check the coil 10 for minimum resistance, the coil having been tested for its maximum resistance. The operation of the relay 28 also opens the short circuit of the winding of relay 59, permitting it to operate.

The operation of relay 59 opens the circuit to contact 57 and closes the circuit from ground at 105 to operate relay 32 and release the solenoid 33 which had been operated. In releasing, the solenoid 33 will permit the contactor 42 to move in a direction dependent upon the direction of current flow in the moving coil 41.

If the resistance of the coil 10 is equal to or greater than the permissible minimum, the current in the moving coil 41 will cause the contactor 42 to engage the contact 55. If contactor 42 engages contact 55, a circuit will be completed from ground at 56 through the contactor, contacts 99 and 100 of relay 28, through the winding of the buzzer 34 and switch 25 to grounded battery tery at 26, operating the buzzer. The operation of the buzzer is an indication that the coil 10 is within the permissible minimum and maximum resistance limits and the coil may therefore be removed from the fixture 16. The removal of the coil from the fixture will permit contacts 19 to open, releasing relays 27, 28, 29, 30, 31, 32 and 59 and placing the set in condition for another test, which may be initiated by inserting another coil in the fixture.

If the coil under test has resistance greater than the maximum permissible, the circuit from ground at 98 through the relay coil 29 will not be completed and the buzzer will not operate. If, on the other hand, the coil 10 under test is less than the permissible minimum, the circuit will operate to the point where relay 32 operates to release the solenoid 33, but the contactor 42 will engage contact 57 a second time and the buzzer will fail to operate due to the break in its operating circuit at contact 58 of relay 59 now operated.

Although a specific embodiment of the invention has been described hereinbefore, it will be understood that many changes and modifications may be made in the circuit without departing from the scope of the invention, which is to be limited only by the scope of the appended claims.

What is claimed is:

1. Testing apparatus, comprising a Wheatstone bridge circuit, a meter type relay connectible across the bridge circuit, a switch operable by an article to be tested for connecting the relay across the bridge, and means for including the article in the unknown arm of the bridge circuit prior to the operation of said switch.

2. Testing apparatus, comprising a Wheatstone bridge circuit, a meter type relay connectible across the bridge circuit, means operable by an article to be tested for connecting the relay across the bridge including a switch positioned to be operated by the article in moving to a predetermined position, and circuits under control of said switch for making said connection, and means for including the article in the unknown arm of the bridge circuit prior to the connection of the relay across the bridge circuit.

3. Testing apparatus, including a Wheatstone bridge circuit, means for connecting an article to be tested in one arm of said bridge circuit, means operable by an article moving into operative association with said bridge circuit for preparing the bridge circuit to make a test, said last named means being operable after the article is connected to the bridge, means controlled by the bridge circuit for changing the value of one arm of the bridge circuit to prepare for a second test if the article meets the first test, and means for giving a signal if an article also meets the second test.

4. Testing apparatus, comprising a Wheatstone bridge circuit, a meter type relay connectible across the bridge circuit and normally disconnected from said bridge, means for connecting an article to be tested in an arm of said bridge circuit, and means operated by the article after its connection to the bridge circuit for connecting the meter type relay across the bridge circuit and simultaneously initiating testing operations.

CHRISTIAN PAULSON.